US009226218B2

(12) United States Patent
Ji

(10) Patent No.: US 9,226,218 B2
(45) Date of Patent: *Dec. 29, 2015

(54) SIGNAL STRENGTH GUIDED INTRA-CELL UPSTREAM DATA FORWARDING

(71) Applicant: AT&T Intellectual Property II, L.P., Bedminster, NJ (US)

(72) Inventor: Lusheng Ji, Randolph, NJ (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 301 days.

This patent is subject to a terminal disclaimer.

(21) Appl. No.: 13/856,685

(22) Filed: Apr. 4, 2013

(65) Prior Publication Data

US 2013/0235799 A1    Sep. 12, 2013

Related U.S. Application Data

(63) Continuation of application No. 13/135,146, filed on Jun. 27, 2011, now Pat. No. 8,422,957, which is a continuation of application No. 12/653,173, filed on Dec. 8, 2009, now Pat. No. 7,983,619, which is a continuation of application No. 11/328,331, filed on Jan. 9, 2006, now Pat. No. 7,653,355.

(51) Int. Cl.
*H04W 4/00* (2009.01)
*H04W 40/22* (2009.01)
*H04L 12/701* (2013.01)
*H04W 88/04* (2009.01)
*H04W 84/12* (2009.01)

(52) U.S. Cl.
CPC .............. *H04W 40/22* (2013.01); *H04L 45/00* (2013.01); *H04W 88/04* (2013.01); *H04W 84/12* (2013.01)

(58) Field of Classification Search
None
See application file for complete search history.

(56) References Cited

U.S. PATENT DOCUMENTS

| 5,999,538 | A | 12/1999 | Haddock |
| 6,862,430 | B1* | 3/2005 | Duffy et al. .................. 455/11.1 |
| 2003/0156558 | A1 | 8/2003 | Cromer et al. |
| 2004/0137930 | A1 | 7/2004 | Kim et al. |

(Continued)

FOREIGN PATENT DOCUMENTS

| EP | 1170901 A1 | 1/2002 |
| EP | 1170901 A3 | 8/2003 |

(Continued)

OTHER PUBLICATIONS

Perkins, Network Working Group Request for Comments: 3561; http://www.ietf.org/rfc/rfc3561.txt, Jul. 2003.

(Continued)

*Primary Examiner* — Andrew Lai
*Assistant Examiner* — Jamaal Henson
(74) *Attorney, Agent, or Firm* — Amin, Turocy & Watson, LLP

(57) ABSTRACT

Intra-cell upstream data forwarding is utilized in a wireless network such as a wireless local area network. A network forwarding path is determined based on the signal strength of an access point signal received at client stations within the network, referred to as the OASS. In particular embodiments, a station that is either originating or forwarding a frame inserts its own OASS into the frame before transmitting it and a client station that receives a frame forwards it only if its own OASS exceeds the frame-enclosed OASS, illustratively by at least a predetermined amount.

19 Claims, 4 Drawing Sheets

(56) References Cited

U.S. PATENT DOCUMENTS

| | | |
|---|---|---|
| 2004/0176090 A1 | 9/2004 | Mudigonda et al. |
| 2005/0064871 A1 | 3/2005 | Kawasaki et al. |
| 2005/0094588 A1 | 5/2005 | Wentink |
| 2007/0082616 A1 | 4/2007 | Bird |
| 2007/0121521 A1* | 5/2007 | D'Amico et al. ............. 370/252 |

FOREIGN PATENT DOCUMENTS

| | | |
|---|---|---|
| EP | 1545062 A2 | 6/2005 |
| EP | 1545062 A3 | 8/2005 |
| EP | 1701486 A1 | 9/2006 |

OTHER PUBLICATIONS

Clausen, et al., Network Working Group Requst for Comments: 3626; http://www.ietf.org/rfc/rfc3626.txt, Oct. 2003.
ANSI/IEEE Std 802.11, Sect. 9.2, 1999 Edition, Aug. 20, 1999.
Sreng, et al., "Relayer selection strategies in cellular networks with peer-to-peer relaying," Vehicular Technology Conference, 2003, VTC 2003-Fall, 2003 IEEE 58th Orlando, FL, Oct. 6-9, 2003, pp. 1949-1953, XP010702827, ISBN 0-7803-7954-3.
Office Action dated Dec. 30, 2008 for U.S. Appl. No. 11/328,331, 13 pages.
Office Action dated May 12, 2009 for U.S. Appl. No. 11/328,331, 11 pages.
Office Action dated Jun. 8, 2010 for U.S. Appl. No. 12/653,173, 14 pages.
Office Action dated Nov. 29, 2010 for U.S. Appl. No. 12/653,173, 10 pages.
Office Action dated Aug. 29, 2012 for U.S. Appl. No. 13/135,146, 7 pages.
Office Action dated May 24, 2012 for U.S. Appl. No. 13/135,146, 10 pages.
Office Action dated Oct. 21, 2011 for U.S. Appl. No. 13/135,146, 10 pages.
International Search Report mailed Jun. 15, 2007 for PCT Application No. PCT/US2007/000098, 5 pages.

* cited by examiner

SIGNAL STRENGTH GUIDED INTRA-CELL UPSTREAM DATA FORWARDING

CROSS-REFERENCE TO RELATED APPLICATION

This is a continuation of application Ser. No. 13/135,146 filed on Jun. 27, 2011, which was a continuation of application Ser. No. 12/653,173 filed on Dec. 8, 2009, now U.S. Pat. No. 7,983,619, issued Jul. 19, 2011, which was a continuation of application Ser. No. 11/328,331, filed on Jan. 9, 2006, now U.S. Pat. No. 7,653,355 issued Jan. 26, 2010.

BACKGROUND

The present invention relates to communications in, for example, wireless local area networks, mobile/cellular and other wireless networks.

In multi-hop wireless networks, such as mobile ad hoc networks, nodes store and forward data frames for each other so the frames can be forwarded to distant destinations that are not within direct wireless communication reach of data sources. Such a forwarding mechanism has not been adopted into wireless local area networks (WLANs). In WLANs, access points are attached to a distribution system (DS), typically a wired local area network (LAN), and stations and access points are within direct communication range of each other. In other words, WLAN architecture extends the boundaries of a distribution system by only one wireless hop. Both station to outside-of-cell (via DS) and outside-of-cell to station types of traffic are directly between the access point and the station. Station to station traffic is transmitted from source station directly to access point then access point directly to destination station. Thus, one might think that there is no need for client stations to forward frames for intra-cell data forwarding, meaning the forwarding of frames to an access point by other client stations of the same cell, i.e., communicating with the same access point.

However, a closer examination of real world WLAN deployments leads to a different conclusion. In these systems, access points are typically at an advantage in terms of radio transmission and reception, as compared to the client stations they serve. Access points are supplied with commercial electrical power while client stations usually are battery-operated. Access points may have additional signal amplification modules and large antenna structures, while client stations usually only have the dimension-limited internal hardware of their wireless network interface cards. The asymmetry between the capabilities of access points and client stations is even more pronounced in special systems such as sensor networks or other networks where the client stations (e.g., sensor nodes) have very limited communication resources.

Because the design of WLAN protocols presumes that client stations and their access points are within range of each other, the coverage area of each cell, i.e., area served by a particular access point, is limited by client station communication capabilities. For example, a distant station, even if within an access point's transmission range, may not be served by the access point because the station's own transmissions are not strong enough to reach the access point. The superior communication capabilities of the access points thus can not be fully taken advantage of.

Intra-cell upstream data forwarding can help. With intra-cell upstream data forwarding, client stations forward other client stations' communications to the access point. This approach has the advantage of increasing the effective service area of each access point because now coverage is limited by the transmission range of the access point and no longer that of the client stations. This effectively reduces the number of access points required for covering an area and thus reduces deployment costs.

In addition, intra-cell upstream forwarding also helps client stations to conserve their valuable battery power. Each shorter transmission consumes less transmission power at each station, and the total energy consumption of multiple transmissions across a certain distance is still typically less than what is consumed by a single long-range transmission over the same distance.

Despite its many advantages, the intra-cell upstream forwarding mechanism has not been widely used. A significant reason relates to the complexity of setting up and maintaining the forwarding paths. Client stations need to exchange control messages to learn about each others' positions relative to the access point and to compute how other stations can be used as forwarding nodes. In mobile scenarios where client station positions change, thereby causing forwarding topology change, more frequent control message exchanges are required to ensure the correctness of forwarding path computation. These known approaches are expensive in terms of communication, computation, and storage overhead, as well as in design and implementation complexity.

SUMMARY OF THE INVENTION

The present invention overcomes disadvantages of known intra-cell forwarding techniques. In accordance with the present invention, a station determines whether or not to forward a message (such as a packet or, more specifically, a WiFi "frame") based on the strength of the access point signal received at that station. That signal strength is referred to herein as the OASS (Observed Access point Signal Strength).

In the illustrative embodiment, in particular, a receiving client station forwards a message from a transmitting client station only if the receiving client station's OASS meets a predetermined criterion. That criterion is illustratively that a particular relationship exists between a) the receiving client station's OASS and b) the OASS for the transmitting station. The relationship may be, for example, that a) exceeds b). In the disclosed embodiment, the criterion is that a) exceeds b) by at least an amount δ. That approach tends to limit the forwarders for a given frame to stations that are closer to the access point than others, thereby minimizing the number of duplicate copies of the frame that are propagated. The value of δ may be either a pre-set configuration parameter for the stations or enclosed in each frame just like the OASS.

Particular implementations of the invention implement this technique by having a station that is either originating or forwarding a frame insert an indication that is a function of its own OASS—illustratively an explicit indication of the OASS—into the message before transmitting it. This enables each station that receives the message to determine the relationship between its own OASS and that of the transmitting station.

The invention offers a number of advantages. For example, it avoids drawbacks of known intra-cell forwarding approaches as described above. Moreover, since the WiFi protocol requires client stations to listen to access point traffic in a network, the design of current client stations is readily and inexpensively modified to measure and record the access point signal strength. Because there is typically ongoing traffic within the downlink coverage area (e.g., WiFi protocol messages, data messages from access point to client stations, acknowledgements of clients' data messages, etc.) stations within the downlink coverage area can readily collect fresh access point signal strength data at no additional cost. In addition, the method can be carried out without the exchange of control messages and is stateless in that it can be implemented without any topological information being stored for data forwarding path computation. The communication overhead of enclosing a small number representing the OASS in each message, or frame, is very low.

The invention is disclosed herein in the context of a wireless local area network. However, the invention is applicable to other types of wireless networks, such as mobile/cellular networks.

DETAILED DESCRIPTION OF THE ILLUSTRATIVE EMBODIMENT

Figure 1:
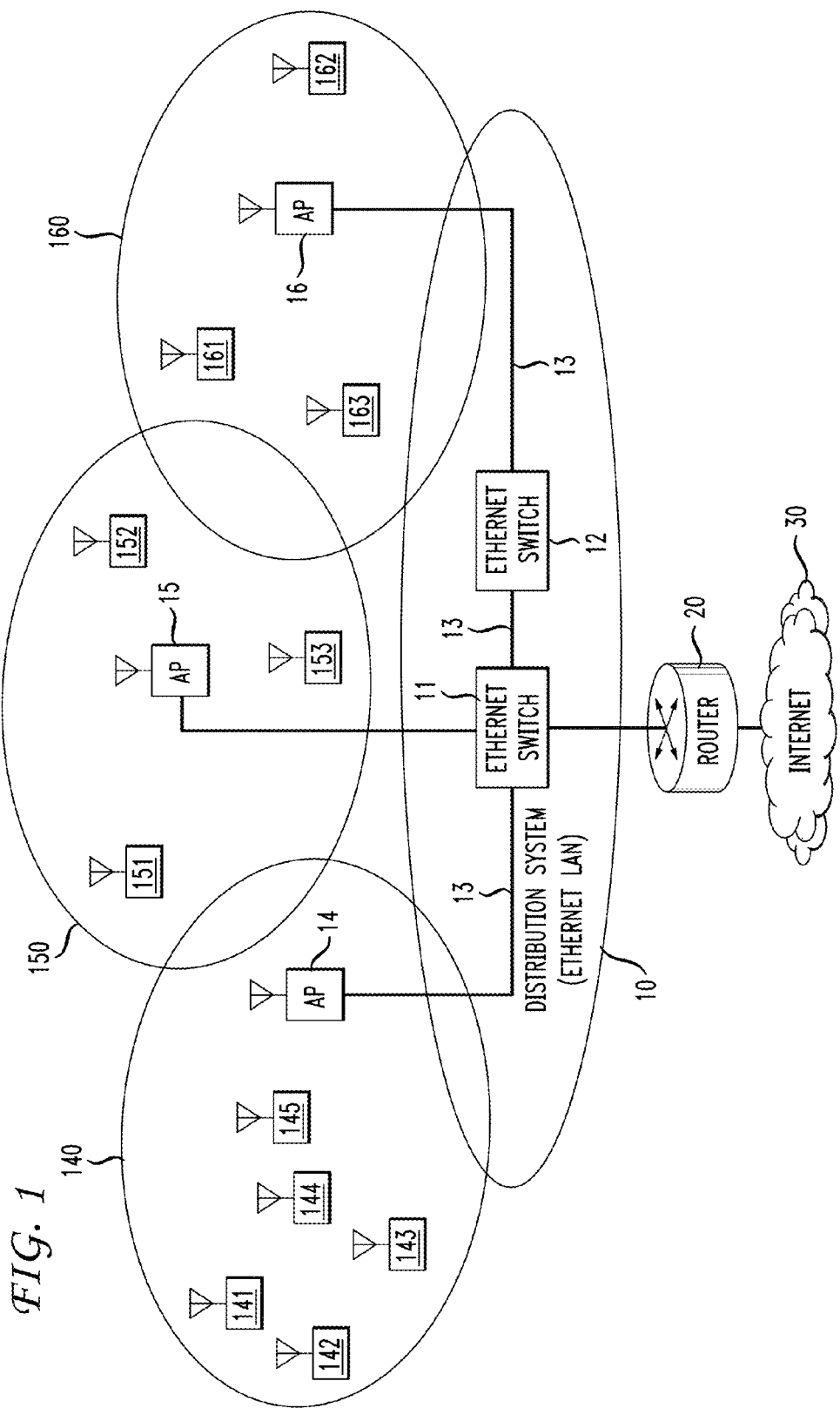
FIG. 1 shows a typical wireless local area network (WLAN) in which the invention is illustratively implemented.

A typical wireless local area network (WLAN) in which the invention is illustratively implemented is shown in FIG. 1. In particular, Ethernet LAN 10 is a distribution system that includes Ethernet switches 11 and 12. Switch 11 provides a gateway for Ethernet LAN 10 to the internet 30 via a router 20. Connected to switches 11 and 12 are one or more fixed-location wireless stations, referred to as access points. Specifically access points 14 and 15 are connected to Ethernet switch 11 and access point 16 is connected to Ethernet switch 12. Ethernet cables 13 serve as the interconnection medium for the various components just mentioned.

Access points 14, 15 and 16 have respective coverage areas 140, 150 and 160. Various wireless client stations are located within the coverage area of the several access points. The client stations are, for example, wireless-capable laptop computers, personal digital assistants or other wireless communication devices that are moved into, out of and within the coverage area. At a point in time depicted in FIG. 1, client stations 141 through 145 are located within coverage area 140, client stations 151 through 153 are located within coverage area 150 and client stations 161 through 163 are located within coverage area 160.

Signaling among the access point and client stations is illustratively carried out using a wireless network protocol based on IEEE standard 802.11b, commonly referred to as WiFi. This is a packet-based protocol in which the packets are referred to as "frames." The coverage area boundary for a particular access point defines a region within which the strength of signals transmitted by the access point is sufficient for client stations to recover the content of the transmitted frames with an acceptable level of accuracy, e.g., with a particular frame error rate. As a matter of terminology for purposes of the discussion herein, references to a station being able to "receive" a frame or a signal mean that the station is able to recover the signal/frame's information content to the desired level of accuracy.

The boundaries of the coverage areas may vary somewhat over time due to a variety of factors including the movement of various objects through the coverage area that can change reflection patterns, as well as the presence within the coverage area of radio signals of all kinds, including WiFi signals from other neighboring cells.

Figure 2:
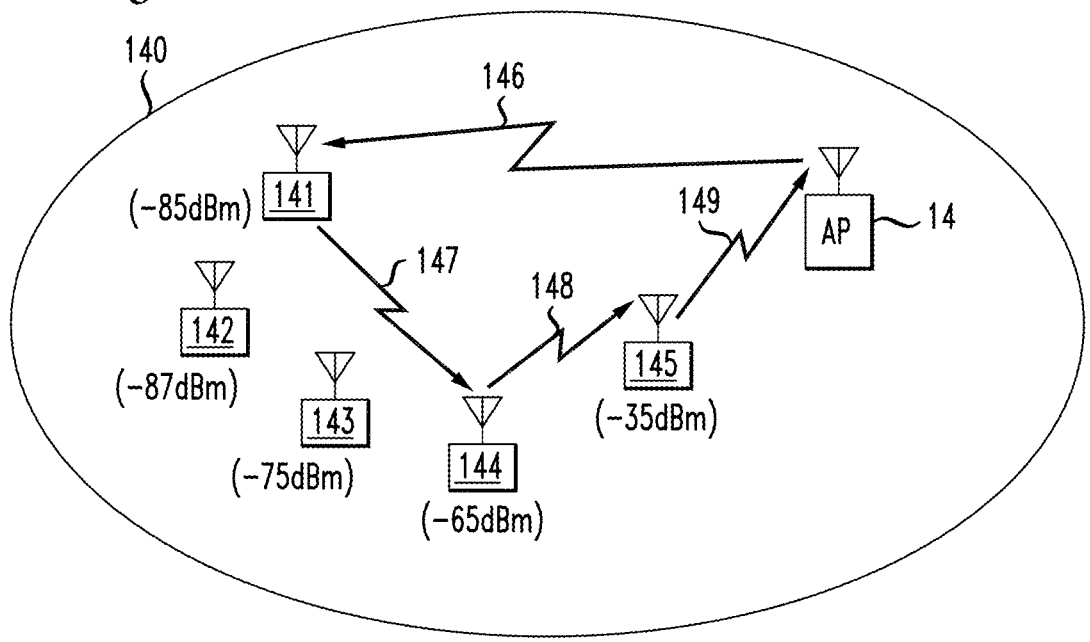
FIG. 2 shows a particular cell of the WLAN of FIG. 1.

FIG. 2 shows access point 14 and client stations 141 through 145 within coverage area 140. This FIG. is helpful in understanding intra-cell forwarding generally as well as in understanding the principles of the present invention. In particular, although client stations within coverage area 140 are able to receive frames transmitted to them "downstream" by access point 14—such as over wireless link 146 between access point 14 and client station 141—this is not necessarily the case for frames transmitted by client stations "upstream" intended for the access point. This is principally a result of the client stations' typically lower transmit signal strength. Thus although frames from client stations that are relatively close to access point 14—such as client station 145—are received by the access point, this may not be so for frames transmitted by the more remote client stations.

A solution to this problem is intra-cell upstream data forwarding. Upstream communications from remote client stations within the cell proceed over multiple short range links from one station to another, with the frame ultimately arriving at the access point. (In addition, station-to-station frames are delivered to the access point via upstream data forwarding, then directly from the access point to the destination station.) As noted above, the known intra-cell data forwarding techniques of flooding the cell and topology based forwarding technique such as mobile ad hoc network (MANET) routing consume an undesirably large amount of resources.

The present invention is directed to a technique, referred to as Signal-Strength-Guided-Intra-Cell Forwarding (SGIF), that overcomes disadvantages of prior approaches such as flooding and topology based forwarding. In accordance with the present invention, a station determines whether or not to forward a message, e.g., packet, based on the strength of the access point signal received at that station, that signal strength being referred to herein as the OASS (Observed Access point Signal Strength).

In the illustrative embodiment, in particular, a receiving client station does not retransmit a frame addressed to another station if the OASS for the receiving station is, or at least appears to be, lower than the OASS of the transmitting client station, i.e., the client station from which the frame was received. Particular implementations of the invention implement this technique by having a station that is either originating or retransmitting ("forwarding") a frame insert its own OASS into the frame before transmitting it. This enables each receiving station to compare its own OASS to the OASS of the transmitting station and to make the above determination.

The invention takes advantage of the fact that due to propagation path loss, the OASS generally decreases as the receivers get farther away from the access point. (The opposite, although not entirely impossible, is rare.) Thus, if the signal strength serves as an "elevation mark" the peak will be located exactly where the access point is. The direction of "elevation" increase also coincides with the direction of upstream data forwarding.

Figure 3:
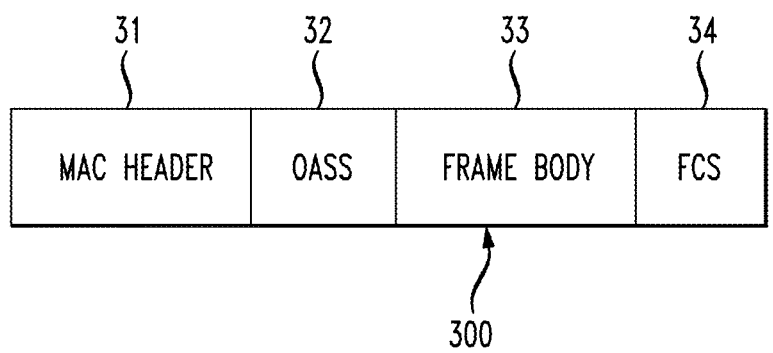
FIG. 3 shows a typical frame containing a field into which a station transmitting the frame can insert its observed access point signal strength (OASS), pursuant to a feature of certain embodiments of the invention.

There are several places for the OASS to be enclosed within a standard WiFi frame. FIG. 3 shows an illustrative WiFi frame format 300 in which an OASS field 32 is inserted between MAC header 31 and frame body 33. In standard WiFi frames the IEEE 802.11 MAC header 31 is immediately followed by frame body 33, which is the payload (data) portion of the frame, and then the checksum Frame Check Sequence (FCS) field 34. In this illustrative example, it is assumed that the present invention is implemented in an SGIF module above the common WiFi MAC layer, as described in further detail below in connection with FIG. 5. Thus a reasonable place to insert the OASS field 32 is after the MAC header 31 as shown in FIG. 3. Doing so, the OASS field 32 and the data field together appear as the frame body 33 to the standard WiFi MAC layer. Once the WiFi MAC layer finishes processing, both the OASS field 32 and data will be passed up to the SGIF module implementing the present invention for processing. This module will process and strip away the OASS field 32 and only passes the true data portion of the frame to higher layers. If one were able to modify the standard IEEE 802.11 frame format and blend the implementation of the present invention within the standard WiFi MAC layer, the OASS field 32 can be alternatively placed within the WiFi MAC header 31. The OASS within field 32 is referred to herein as the "frame-enclosed OASS."

In particular embodiments, the above-stated criterion—i.e., that a receiving client station does not retransmit a frame if its OASS is, or at least appears to be, lower than the OASS of the transmitting client station—is implemented by the receiving station forwarding a frame based on a determination that the OASS for the receiving station exceeds the OASS for the transmitting station. In the present disclosed embodiment, however, a further constraint is applied. In particular, a station retransmits a frame only if its own OASS exceeds the frame-enclosed OASS by at least an amount δ. In other words, only if a station's OASS is greater than the quantity [frame-enclosed-OASS+δ] does it retransmit the frame. This, in effect, limits the forwarders of a frame to stations that are within a zone whose size is determined by the parameter δ. This conserves network resources by controlling the number of instances of a particular frame being forwarded throughout the network. The value of δ may be either a pre-set configuration parameter for the stations that, for example, the access point distributes or it may be enclosed in each frame just like the OASS. In the latter case, the value of δ could be determined by the transmitting station based on traffic observations or other historical data, thereby tailoring the value δ to one that achieves a desirable balance between a) frame delivery assurance and b) limiting the number of stations involved in forwarding the frame.

The foregoing is illustrated in FIG. 2 relative to communications between access point 14 and client station 141. As shown in FIG. 2, client station 141 is able to receive communications from access point 14 over single-hop access-point-to-station wireless link 146. However, the signal strength of client station 141 is too weak for access point 14 to receive communications from client station 141 directly. Frames transmitted by client station 141 can, however, be received by client stations that are closer to client station 141 than access point 14. In this example, it is assumed that client station 141 has just transmitted a frame and that client stations 142, 143 and 144 all receive that frame. As indicated in FIG. 2, the strength of the signal from access point 14 most recently observed at client station 141—its OASS—is −85 dBm. That OASS value was inserted into OASS field 32 (FIG. 3) by client station 141 before the frame was transmitted. As indicated in FIG. 2, the OASS for client station 142 is −87 dBm, which is less than the −85 dBm value in OASS field 32. (Since the signal strengths are negative numbers, the value of a particular OASS exceeds that of another OASS if its absolute value is smaller. Thus, −85 dBm>−87 dBm.) Accordingly, client station 142 does not retransmit the frame.

The OASS for client station 143 is −75 dBm, which is greater than the OASS of −85 dBm contained in field 32. In some embodiments of the invention, this may be sufficient for client station 143 to retransmit the frame. In the present illustrative embodiment, however, it is not enough for a potential forwarder's own OASS to simply exceed the frame-enclosed OASS in order for the potential forwarder to actually retransmit the frame. Rather, in this embodiment the potential forwarder's OASS must exceed the frame-enclosed OASS by at least an amount δ. In this example, δ=15 dBm. That is, a potential forwarding station's OASS must exceed the OASS contained within field 32 by at least 15 dBm in order for the receiving station to retransmit the frame. Although the OASS for client station 143 exceeds that of client station 141, the difference is only 10 dBm, which is less than the required difference of 15 dBm. Accordingly, client station 143 does not retransmit the frame either.

By contrast, the OASS for client station 144 is −65 dBm, which exceeds the −85 dBm contained in field 32 by 20 dBm. Accordingly, client station 144 does retransmit the frame.

Before retransmitting the frame, however, client station 144 overwrites the OASS field 32 with its own OASS of −65 dBm. That retransmitted frame is illustratively received by all of the client stations shown in FIG. 2 but not by access point 14. Client station 141 does not retransmit the frame since it was the originator of the frame. Client stations 142 and 143 do not retransmit the frame since their OASS's are less than the −65 dBm that client station 144 inserted in field 32 prior to retransmitting the frame.

However, the OASS for client station 145 is −35 dBm, which exceeds the −65 dBm contained in field 32 by 30 dBm. Accordingly, client station 145 does retransmit the frame. Moreover, the signal strength of client station 145 is sufficient for the frame to be received by access point 14. It is thus seen that the original frame transmitted by client station 141 has made its way to access point 14 over a signal path comprising multiple short-range links 147, 148 and 149.

In this simple example, the frame reaches access point 14 over only one signal path. In general, however, multiple paths each meeting the criteria for cell forwarding at each hop may occur, resulting in multiple copies of the frame reaching access point 14. The WiFi protocol and higher layer protocols such as IP enable the access point or the final destination of the communication to recognize duplicate frames and to discard all but one.

Figure 4:
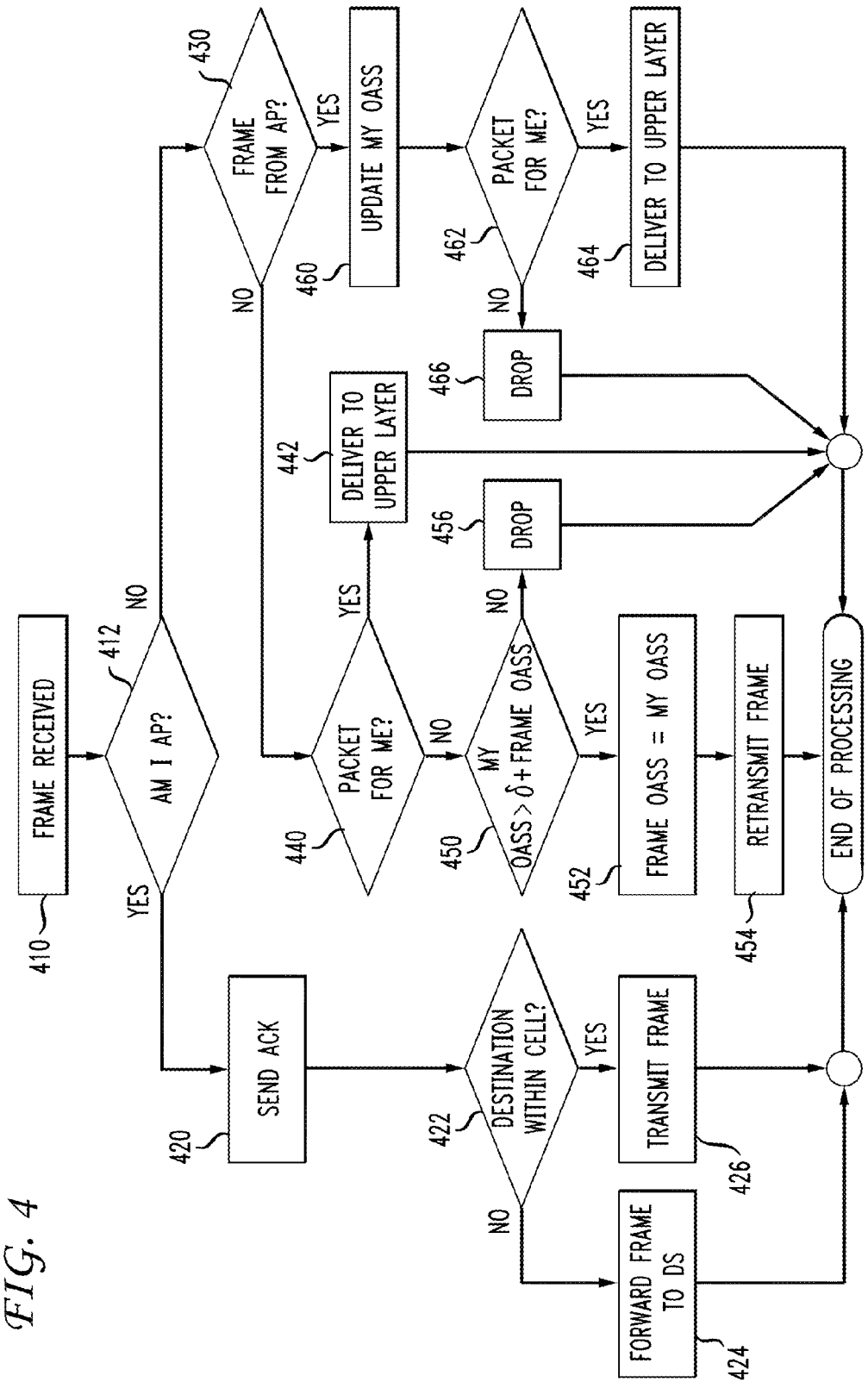
FIG. 4 is a flowchart of operations performed within access points and client stations in implementing the principles of the present invention.

The processing carried out by an access point or a client station upon the receipt of a frame is illustrated in FIG. 4. This processing is illustratively carried out at the data link layer of the WiFi protocol.

After the frame is received at 410, the process differs for access points and for client stations. Access points and stations are typically configured at the time of manufacture or deployment in such a way that they can determine what kind of node they are. If the receiving node determines, at 412, that it is an access point, it needs to send back an acknowledgement (ACK) of the frame at 420, pursuant to the WiFi protocol. It is then determined at 422 whether the frame is destined for a station within the same cell. The access point is aware of the MAC addresses of all of the client stations within its cell and can thus make that determination. If the frame is destined for a station within the same cell, then the access point transmits the frame to that station at 426. If the frame is not addressed to a station within its cell, then at 424 the access point forwards the frame to the distribution system (DS), that is, to Ethernet LAN 10 and, more specifically, to the access point's attached Ethernet switch. From there the frame is transmitted within Ethernet LAN 10 or outside of the LAN via the internet, depending on the location of the destination station.

Returning to decision point 412, and assuming that the receiving node is a client station rather than an access point, the client station needs to determine, at 430, whether the frame is from its serving access point as can be determined from the BSSID field and the source MAC address within the frame's MAC header. If the frame is from the access point, the OASS value stored locally within the client station (e.g., in storage location or register 575 described below in conjunction with FIG. 5) is updated at 460 using the OASS that was most recently measured at the OSI physical layer (as also described below). That OASS will typically be the OASS associated with the frame currently being processed. If, as determined at 462, the frame is not destined for the receiving station itself, the received frame is dropped at 466. Otherwise, at 464, the frame is passed to the upper layers of the WiFi protocol stack for further processing.

Returning to decision point 430, and assuming that the received frame is not from the access point, the receiving station needs to check at 440 if the frame is for itself. If it is, the received frame is passed at 442 to the upper layers of the WiFi protocol stack for further processing. If the frame is not intended for the receiving station, the receiving station is a potential forwarder of the frame. Accordingly, the station determines at 450 whether its own OASS exceeds the frame-enclosed OASS by more than 6, denoted in FIG. 4 as MY OASS>δ+FRAME OASS. If it is not, the receiving station drops the frame at 456. Otherwise, the receiving station is to forward, i.e., retransmit, the frame at 454. Before doing so, however, the station overwrites OASS field 32 with its own OASS at 452.

As a result of the sequence of operations just described, a frame is forwarded towards the access point and eventually reaches the access point.

A client station transmitting a frame needs to ascertain that the frame was received. The WiFi protocol supports an acknowledgement scheme wherein a station that receives a frame sends an acknowledgement message to the frame transmitter after successfully receiving a data frame. If a transmitting station does not receive an acknowledgement within a preset timeout period, it assumes that the message was not received and it initiates a re-transmission. Such an explicit acknowledgement scheme, if intra-cell forwarding is implemented, results a chain of hop-by-hop data-acknowledgement exchanges. Although such a scheme improves transmission reliability, disadvantageously, however, having each receiving client station acknowledge each frame that it receives and forwards will consume significant amounts of air time and battery power.

In the present embodiment, however, such acknowledgements are not sent by each forwarding station. Rather, the illustrative embodiment uses implicit acknowledgements. By this is meant that after a station transmits a frame, it knows the frame was received by some next hop client station—and that forwarding is in progress—if it overhears a retransmission of the frame by some client station, and thus it knows that it need not re-send the frame even in the absence of an explicit acknowledgement. This is known as the implicit acknowledgement because the retransmission of the same data frame implies the successfully reception of the frame by the forwarder. If a station does not overhear a retransmission of the frame within a particular preset period of time, then it re-sends it.

The access point does, nonetheless, need to eventually explicitly acknowledge the reception of the frame. In this case since the data frame is not forwarded further, implicit acknowledgement is no longer an option. Both implicit acknowledgement as described in the previous paragraph and explicit acknowledgement from the access point informs a forwarding station that the forwarded frame has been received successfully. If neither is detected within a particular preset period of time a station involved in the frame forward initiates retransmission (re-forwarding) of the data frame. This function can be implemented by a timer similar to the standard WiFi acknowledgement timer.

This access point acknowledgement actually serves three purposes: a) to explicitly acknowledge the last forwarder, b) to inform all client stations in the cell there is no need to forward this frame any more, and c) to acknowledge to the original source of the frame that the delivery was successful. Although the original source learns that its data frame is being forwarded from the implicit acknowledgements from the first hop forwarders, if the forwarding fails farther down the forwarding path and the forwarder gives up trying after a preset number of attempts, the original source may not be aware of such failure because the lack of implicit acknowledgement is beyond the reception range of the original source. The final explicit acknowledgement from the access point ultimately answers the question of whether the data frame has arrived at the access point. An acknowledgement timer similar to the standard WiFi acknowledgement timer—except that the preset expiration time of this timer takes multi-hop intra-cell forwarding operations into consideration and thus is typically longer—is needed for the original source. If no acknowledgement from the access point is received before this timer expires, the source station's SGIF module will try to resend the data frame for a preset number of times before it declares "unable to transmit to access point" to its upper layers.

In general, each time a frame is retransmitted, it gets closer to the access point. However, while a frame is being forwarded, if after a particular forwarder there are no other stations having higher OASS within the reach of this forwarder, the frame forwarding path is broken. A station can discover that it is the last hop before a gap along the forwarding path by observing the lack of implicit acknowledgement from other forwarder or explicit acknowledgement from the access point for its transmissions. The analogy of this situation in mountain climbing is that a climber has reached the top of a small peak before the real peak. So to get to the real peak, he/she would have to step down from the small peak first. In the SGIF case, the equivalent of "stepping down" is for the forwarder—having determined that its frame was not retransmitted by another station—to retransmit the frame with an artificially reduced OASS. (In embodiments in which, as suggested above, δ is also embedded in each frame, the same effect can be achieved by making the value of δ smaller or even negative.) This way the forwarding path may temporarily back track to stations farther away from the access point and hopefully other successful forwarding paths along different directions can be explored from there.

Figure 5:
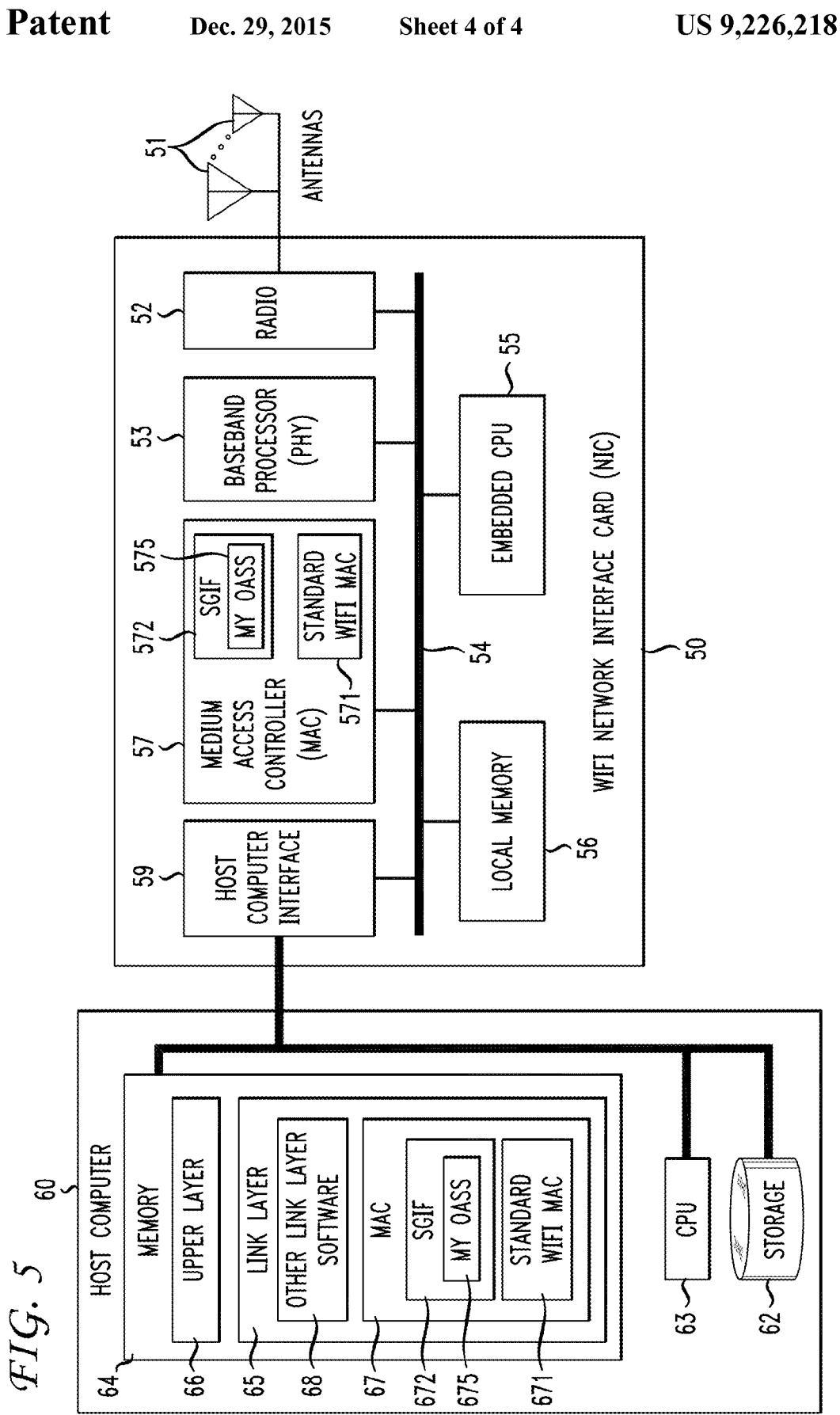
FIG. 5 is a block diagram of a typical access point or client station within the WLAN of FIG. 1.

FIG. 5 is a block diagram of a station implementing the SGIF technique of the present invention. The FIG. represents both client stations and stations that are access points. The station is in two parts—WiFi network interface card, or NIC, 50 and host computer 60. In particular, NIC 50 includes radio 52; baseband processor 53 which implements the physical layer of the WiFi communication stack; medium access controller, or MAC, 57, which implements a sub-layer of the data link layer of the WiFi communication stack and is sometimes referred to as "lower MAC"; and host computer interface 59. These are all connected to a bus 54 and are controlled by embedded central processing unit, or CPU, 55 having an associated memory 56, both of which are also connected to bus 54.

The above are standard network interface card components known in the art and in current commercial use and need not be described in further detail except with respect to their involvement in implementing the present invention. In particular, the software in MAC 57 includes "standard" WiFi MAC 571 implementing standard MAC functions. Once standard WiFi MAC 571 layer finishes its processing of a received frame, that frame is passed up to SGIF module 572 that implements certain of the illustrative functions implementing the invention as set forth in FIG. 4—illustratively, functions 410, 412, 430 and 460. Specifically, SGIF module 572 obtains the current OASS for the station (denoted MY OASS) using a conventional MAC command that queries baseband processor 53 for this piece of information. The value of MY OASS thus received is stored in memory location 575 associated with SGIF module 572.

In other embodiments, any or all of the MAC functionality, including the functionality of the SGIF module, can be implemented using any desired technology, including any combination of hardware, software, digital signal processors, and the like. In some such implementations, the OASS obtained by SGIF module 572 as just described might be stored in a designated hardware register rather than in a general purpose memory location, in which case reference numeral 575 would be understood as referring to such a register.

Host computer 60 includes CPU 63, storage 62 and memory 64. The latter contains link layer software 65 and software 66 implementing the upper (network, transport, session, presentation and application) layers of the protocol stack. Link layer software 65 includes the portion of the MAC sublayer not included in "lower MAC" 57 in network interface card 50. That portion is "upper MAC" 67. Link layer software 65 further includes software 68 implementing the non-MAC portion of the link layer.

Upper MAC 67 includes "standard" MAC 671 implementing those aspects of the standard MAC sublayer not implemented by lower MAC 57. MAC 67 also includes SGIF module 672 implementing the remainder of the functions shown in FIG. 4, i.e., all of the functions except for functions 410, 412, 430 and 460, that implement the principles of the present invention. The value of MY OASS passed to SGIF module 672 is stored in memory in a location denoted 675.

Although not explicitly discussed herein, those skilled in the art are aware that frames that are originated by host computer 60 are processed down through the protocol stack from upper layers 66 through link layer software 65 and then into network interface card 50 for lower MAC and physical layer processing before being transmitted by radio 52.

The foregoing merely illustrates the principles of the invention and many alternative arrangements embodying the principles of the invention are possible.

For example, although the δ parameter may limit the size of the forwarding zone, duplicated forwarding may still occur. Duplicated forwarding may not necessarily be disadvantageous because it improves data forwarding reliability. It is nonetheless less desirable in systems where redundant transmission should be kept to a minimum. In such a case, an optional SGIF technique may be employed. That is, instead of simply comparing OASS's, potential forwarders may execute a back-off mechanism as do transmitters in many contention-based systems. After a potential forwarder receives a frame and determines, based on its OASS, that it can forward the frame, it does not immediately do so but, rather, it starts a back-off timer. The initial duration setting of the timer should be reversely correlated (for example, inversely proportional, either linearly or exponentially) to the difference between the potential forwarder's OASS and the enclosed OASS in the received frame. That is, the smaller the OASS difference, the longer the timer duration setting. While this timer is counting down, the station observes whether any other client station forwards the same frame. If some other station does forward the same frame, this potential forwarder gives up by dropping the frame. The fact that some other station already forwarded the frame means that that other station has a higher OASS and is thus closer to the access point. If the timer expires and no other station was observed to have forwarded the frame, then this station forwards it. Using this approach, forwarders closer to the access point are given preference and duplicated forwarding is eliminated or reduced.

The above-described back-off technique can be used to implement embodiments of the invention that do not require the enclosing of the OASS in the frames. Instead, a pre-set "lowest possible," or "floor," OASS value would be used in the calculation of the initial duration setting of the countdown timer instead of the enclosed OASS. Although this approach increases the waiting period before a client station decides to forward, it does have the advantage of not requiring any frame format change and may be appealing for situations in which any change of frame format is not feasible or is regarded as undesirable.

Other variations are possible. For example, as previously noted, the invention can be implemented in networks other than wireless LANs. Moreover, stations participating in the communications and implementing the invention may be other than entities that function as WLAN "access points" and/or as "client stations." That is, forwarding pursuant to the principles of the invention may be carried out in a network comprising entities other than those which might be characterized as "access points" or "client stations."

In some applications, it might be found desirable to retain within a frame a list of the OASS's of each station in the forwarding path, rather than having each station overwrite the value at each forwarding station. Moreover, although as previously noted the invention can be implemented without the exchange of control messages and without any topological information being stored for data forwarding path computation, the invention might be implemented in conjunction with these if it were to prove advantageous.

Although in the disclosed embodiment an indication of the OASS is enclosed within the frames, an indication that is a function of the OASS, such as only its most significant bits or some other parameter that is dependent upon the OASS, might be used.

It is possible in embodiments in which the OASS is enclosed within frames that this will be done selectively. As but one example, a client station may withhold inserting its OASS in a frame if, for example, it knows that it is sufficiently close to the access point that the frame will not need to be forwarded through another client station.

In applications that use the parameter δ per the description above, the value of that parameter might be dynamically adapted depending on, for example, one or more network and/or cell performance measures.

Although the disclosed embodiment divides the functionality of a station in implementing the invention between two components, a network interface card and a host computer, those functions may both be implemented in one or the other of those components, or in other system components. Moreover any or all aspects of the WiFi protocol, including those which implement the present invention, may be realized in hardware, software, firmware, microcode or any desired technology.

Downlink communications do not need to use the same communication technology as the uplinks. For example, in applications where data traffic is largely from clients to access points, the downlink may use a low bandwidth but long range communication technology to cover a large area. Depending on system requirements, even non-RF technologies such as optical and acoustic may be used as downlinks as long as the OASS measure is still available to the client stations.

It will thus be appreciated that those skilled in the art will be able to devise numerous arrangements that, although not explicitly shown or described herein, implement the principles of the invention and are within their spirit and scope.

The invention claimed is:

1. A method, comprising:
   determining by a first station device comprising a processor, a signal strength of the first station device;
   associating, by the first station device, the signal strength with signal strength data;
   receiving, by the first station device, other signal strength data, representative of another signal strength associated with a second station device, from the second station device;
   receiving, by the first station device, message data addressed to a third station device from the second station device;
   comparing, by the first station device, the signal strength data to the other signal strength data; and
   forwarding, by the first station device, the message data to the third station device in response to a determination that the signal strength exceeds the other signal strength by at least a predefined factor associated with an observed access point signal strength, wherein the predefined factor is a negative number.

2. The method of claim 1, wherein a media access control frame insert is forwarded as a function of the other signal strength.

3. The method of claim 1, further comprising:
   inserting, by the first station device into a media access control frame, an indication of the signal strength as a function of the first station device.

4. The method of claim 1, wherein the message data is forwarded unless there is an indication that the message data has previously been forwarded.

5. The method of claim 1, further comprising:
   inserting, by the first station device, a signal strength data field associated with the signal strength data into a media access control frame of a wireless fidelity media access control layer.

6. The method of claim 5, wherein the signal strength data field is between a media access control header and a media access control frame body.

7. The method of claim 5, wherein the signal strength data field is inserted after a media access control header.

8. The method of claim 5, further comprising:
   transmitting, by the first station device, the signal strength data field to a signal strength guided intra-cell forwarding module.

9. The method of claim 8, further comprising:
   removing, by the first station device, the signal strength data field, wherein the removing the signal strength data field leaves the signal strength data to be transferred to another media access control layer.

10. The method of claim 1, further comprising:
    inserting, by the first station device, a signal strength data field associated with the signal strength data into a media access control header.

11. A system, comprising:
    a processor; and
    a memory that stores executable instructions that, when executed by the processor, facilitate performance of operations, comprising:
    receiving signal strength data related to a signal strength of a first station device;
    receiving other signal strength data related to another signal strength of a second station device;
    receiving message data, addressed to a third station device, from the first station device;
    comparing the signal strength data to the other signal strength data; and
    forwarding the message data to the third station device in response to a determination that the signal strength is greater than the other signal strength by at least a predetermined factor associated with an observed access point signal strength, wherein the predetermined factor is a negative number.

12. The system of claim 11, wherein the operations further comprise:
    inserting a signal strength data field comprising the signal strength data into a media access control frame.

13. The system of claim 12, wherein the signal strength data field is inserted after a media access control header.

14. The system of claim 13, wherein the signal strength data field is inserted before a media access control frame body.

15. The system of claim 11, wherein the signal strength data is inserted into a media access control header.

16. A non-transitory computer readable storage medium storing executable instructions that, in response to execution, cause a device comprising a processor to perform operations, comprising:
    determining first signal strength data associated with a first signal strength of a first access point device;
    receiving second signal strength data associated with a second signal strength of a second access point device;
    receiving message data, addressed to a third access point device, from the second access point device;
    comparing the first signal strength data to the second signal strength data;
    inserting the first signal strength data into a wireless fidelity media access control header in response to a determination that the first signal strength exceeds the second signal strength by at least a predefined amount associated with an observed access point signal strength, wherein the predefined amount is an absolute value; and
    forwarding the message data to the third access point device.

17. The non-transitory computer readable storage medium of claim 16, wherein the operations further comprise:
    updating the second signal strength data in response to a determination that the first signal strength data has been determined.

18. The non-transitory computer readable storage medium of claim 17, wherein the operations further comprise:
    determining whether the message data is for the third access point device.

19. The non-transitory computer readable storage medium of claim 18, wherein the operations further comprise:
   determining third signal strength data related to a third signal strength of the third access point device; and
   forwarding the message data based on a determination that the third signal strength is greater than the second signal strength.

\* \* \* \* \*